UNITED STATES PATENT OFFICE.

JAMES C. ANDERSON, OF HIGHLAND PARK, ILLINOIS.

MANUFACTURE OF VITREOUS BRICKS.

SPECIFICATION forming part of Letters Patent No. 468,320, dated February 9, 1892.

Application filed August 23, 1888. Serial No. 283,560. (No specimens.)

*To all whom it may concern:*

Be it known that I, JAMES C. ANDERSON, a citizen of the United States, and a resident of Highland Park, in the county of Lake and State of Illinois, have invented a new and useful Improvement in the Manufacture of Vitreous Bricks, of which the following is a specification.

My invention relates to improvements in the art of manufacturing vitreous or semi-vitreous bricks; and its object is to produce a vitreous or semi-vitreous brick throughout its entire body, which renders it non-osmotic in its nature.

My invention consists in mixing with the clay chloride of sodium while both are in a dry condition, reducing the same to an impalpable powder, pressing the same into bricks or other pottery shapes while the compound is in a dry condition, and also in the method of burning the same, which consists in placing the bricks containing the chloride of sodium in a remote portion of a kiln containing brick having no chloride of sodium in their composition, as will more fully hereinafter appear.

In the manufacture of fine pressed brick from dry-clay powder as heretofore practiced by me I have found it difficult to sufficiently burn the same to the proper degree of hardness throughout the whole kiln, for the reason that bricks when molded out of dry-clay powder by intense pressure require a much higher degree of heat to burn them to the condition of pottery than bricks made from the same clays in the wet or paste state, and when such bricks are piled in the kilns in large bodies and subjected to the intense heat requisite to burn the same that portion of the body which comes closest to the fire of necessity receives more heat than is required to properly burn them before a proper degree of heat can be communicated to those farthest from the fire or source of heat, and thus a part becomes overburned, branded, warped, and spoiled before the others are sufficiently burned. To overcome this objection and also to produce a brick that will be semi-vitreous throughout its entire body, so as to render it non-osmotic, I take the chloride of sodium in a dry powdered condition, in quantity from one to two per cent., which I add to the dry clay before the same is pulverized, and then pass the mixture or batch through a suitable pulverizing mechanism, reducing the same into a dry homogeneous powder, and then submitting such powder to intense pressure, after which these bricks are piled or set in that part of the kiln most remote from the source of the flames, while a proper portion of bricks made by the same process and from the same clays, except the addition of the chloride of sodium, as described, are placed in that part of the kiln nearest to the source of the flame, where they will be subjected to the greatest heat, for it will be understood that the bricks heated with the chloride of sodium in the manner described will not only require a much less degree of heat to burn the same, but will be rendered homogeneous, having a hard semi-vitreous body texture and will be practically non-porous.

I do not wish to be understood as limiting myself to the use of chloride of sodium as the only substance which will produce the vitrification or semi-vitrification of the brick, for the reason that borax, potash, or any of the kindred salts or alkalies may be used to advantage.

Having thus described my invention, what I claim is—

The process of manufacturing vitreous or semi-vitreous bricks, which consists in mixing with the clay chloride of sodium or kindred salts or alkilies while both are in a dry condition, reducing the same to an impalpable powder and pressing them into brick or other pottery shape, and finally exposing the same to the remote heat of the kiln, as herein set forth.

In testimony whereof I have signed my name to this specification, in the presence of two subscribing witnesses, on this 21st day of August, A. D. 1888.

J. C. ANDERSON.

Witnesses:
C. M. CHAMLEY,
G. T. CONLY.